(12) United States Patent
Farah et al.

(10) Patent No.: US 8,182,199 B2
(45) Date of Patent: May 22, 2012

(54) TURBINE SHROUD COOLING SYSTEM

(75) Inventors: Assaf Farah, Charlemagne (CA);
Terrence Lucas, Candiac (CA)

(73) Assignee: Pratt & Whitney Canada Corp.,
Longueuil (CA)

( * ) Notice: Subject to any disclaimer, the term of this patent is extended or adjusted under 35 U.S.C. 154(b) by 1229 days.

(21) Appl. No.: 11/670,344

(22) Filed: Feb. 1, 2007

(65) Prior Publication Data

US 2008/0187435 A1    Aug. 7, 2008

(51) Int. Cl.
*F01D 25/14* (2006.01)
*F01D 25/08* (2006.01)

(52) U.S. Cl. .................. 415/1; 415/116; 415/173.1

(58) Field of Classification Search ............. 415/1, 115, 415/116, 173.1, 213.1
See application file for complete search history.

(56) References Cited

U.S. PATENT DOCUMENTS

| | | | |
|---|---|---|---|
| 4,733,538 A | | 3/1988 | Vdoviak et al. |
| 5,417,545 A * | | 5/1995 | Harrogate ................ 415/115 |
| 5,486,091 A | | 1/1996 | Sharma |
| 5,584,651 A * | | 12/1996 | Pietraszkiewicz et al. ... 415/115 |
| 5,593,276 A | | 1/1997 | Proctor et al. |
| 5,593,277 A * | | 1/1997 | Proctor et al. ............. 415/173.1 |
| 5,993,150 A * | | 11/1999 | Liotta et al. .................. 415/115 |
| 6,116,852 A * | | 9/2000 | Pierre et al. .................. 415/115 |
| 6,139,257 A * | | 10/2000 | Proctor et al. ............... 415/115 |
| 6,402,458 B1 | | 6/2002 | Turner |
| 6,554,562 B2 | | 4/2003 | Dudebout et al. |
| 6,792,757 B2 | | 9/2004 | Borns et al. |
| 6,899,518 B2 * | | 5/2005 | Lucas et al. .................. 415/116 |
| 6,973,419 B1 | | 12/2005 | Fortin et al. |
| 7,004,720 B2 * | | 2/2006 | Synnott et al. .............. 415/115 |
| 7,033,138 B2 * | | 4/2006 | Tomita et al. ............... 415/139 |
| 7,114,323 B2 | | 10/2006 | Schlinker et al. |
| 7,246,993 B2 * | | 7/2007 | Bolms et al. .................. 415/116 |

FOREIGN PATENT DOCUMENTS

WO    WO9529331    11/1995

* cited by examiner

*Primary Examiner* — Edward Look
*Assistant Examiner* — Sean J Younger
(74) *Attorney, Agent, or Firm* — Norton Rose Canada LLP (57) ABSTRACT

A method of cooling a shroud ring in a turbine section of gas turbine engine includes identifying a series of alternating high temperature regions and lower temperature regions of a circumferential temperature distribution about the inner surface of the shroud ring, and impinging cooling air on to an outer surface of the shroud ring. More cooling air is impinged onto regions which correspond to the high temperature regions on the shroud ring than to regions corresponding to the lower temperature regions of the shroud ring.

15 Claims, 5 Drawing Sheets

TURBINE SHROUD COOLING SYSTEM

TECHNICAL FIELD

The present invention relates to gas turbine engines and, more particularly, to turbine shroud cooling in a gas turbine engine.

BACKGROUND OF THE INVENTION

Being exposed to very hot gases which flow through the turbine section of the gas turbine engine, turbine shrouds usually need to be cooled. However, since flowing coolant through the shroud diminishes overall engine performance, it is typically desirable to minimize the cooling flow consumption without degrading shroud segment durability. Most existing cooling schemes still generally demand higher than required cooling air consumption, which therefore limits engine performance.

Accordingly, there is a need to provide an improved shroud cooling system which addresses these and other limitations of the prior art.

SUMMARY OF THE INVENTION

It is therefore an aim of the present invention to provide an improved impingement cooling system for a hot end component of a gas turbine engine.

In accordance with an aspect of the present invention, there is therefore provided a method of cooling a static component located downstream of a combustor in a gas turbine engine, the component being exposed to an annular hot gas flow produced from said combustor, the method comprising: determining a temperature distribution in the annular hot gas flow; identifying local high temperature regions at circumferential positions about the annular hot gas flow; determining an amount of cooling air flow required to reduce the temperature in said local high temperature regions; determining a desired distribution of the cooling air flow on the component by clocking targeted locations for cooling to the circumferential positions of the identified local high temperature regions, such as to target cool said identified local high temperature regions; and impingement cooling the component by providing said amount of cooling air flow in said targeted locations.

There is also provided, in accordance with another aspect of the present invention, a method of cooling a shroud ring in a turbine section of gas turbine engine, at least an inner surface of the shroud ring being exposed to an annular hot gas flow produced from a combustor of the gas turbine engine, the method comprising: identifying a series of alternating high temperature regions and lower temperature regions of a circumferential temperature distribution about the inner surface of the shroud ring; and impinging cooling air on to an outer surface of the shroud ring, including the step of impinging more cooling air to regions corresponding to said high temperature regions on the shroud ring than to regions corresponding to said lower temperature regions of the shroud ring.

Another aspect of the present invention provides for an impingement cooling system for cooling a static component located downstream of a combustor in a gas turbine engine, the component being exposed to an annular hot gas flow produced from said combustor, the system comprising a casing assembly which surrounds the component, the casing assembly having an element including a plurality of impingement cooling holes defined through the element and which direct cooling air from a pressurized air source onto a radially outer surface of the component for impingement cooling of the component, said impingement cooling holes being arranged in an annular band about a circumference of the casing assembly and including alternating first and second groups of holes, the first groups of holes in use providing more impingement cooling air onto the component than the second groups of holes, the first groups of holes being provided in varying density, with regions of higher density circumferentially aligned with discrete high temperature regions distributed in use circumferentially around the component.

There is further provided, in accordance with another aspect of the present invention, a gas turbine engine comprising: a compressor, a combustor and a turbine serially connected to one another in flow communication, the turbine section including an annular shroud ring for surrounding a stage of turbine blades, the shroud ring being concentrically mounted within a supporting turbine support case, the turbine support case having a plurality of impingement cooling holes extending between an inner and an outer surface of the turbine support case and being arranged in a circumferentially extending band, the impingement cooling holes being fed with cooling air from a source disposed outside the turbine support case and directing said cooling air through the turbine support case and onto targeted locations on an outer surface of the shroud ring for impingement cooling of said targeted locations, said impingement cooling holes being arranged in a configuration having first zones of holes which provide more cooling air through the turbine support case and second zones of holes which provide less cooling air through the turbine support case than the first zones, the first and second zones alternating about the circumference of the band, the first zones being circumferentially aligned in the turbine support case to correspond to identified circumferentially spaced high temperature regions of the turbine shroud ring which correspond to circumferentially spaced apart locations of the fuel nozzles in the combustor.

BRIEF DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
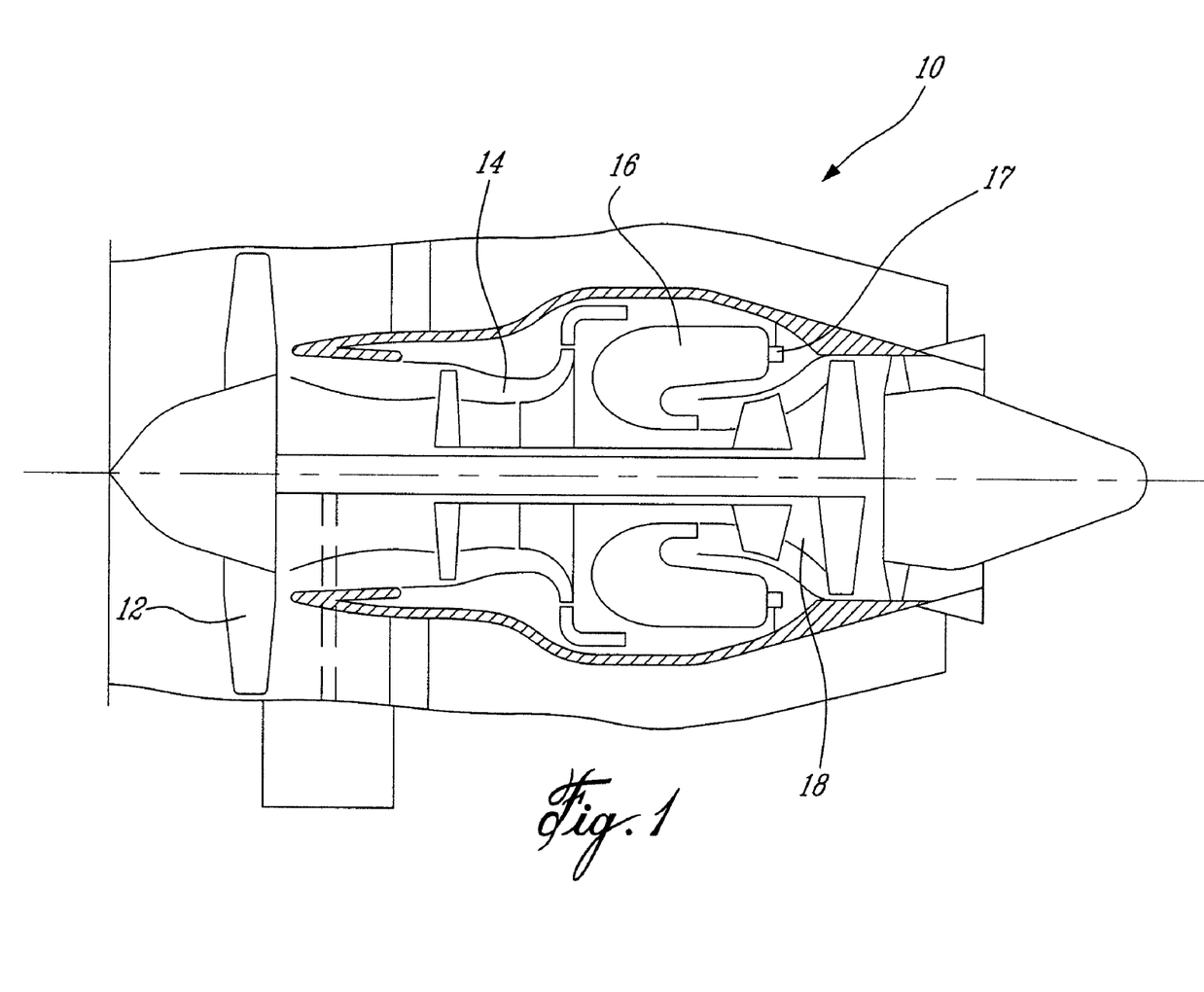
FIG. 1 is a schematic cross-sectional view of a gas turbine engine.

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited using a series of circumferentially distributed fuel nozzles 17 for generating an annular stream of hot combustion gases which exits the combustor 16 and enters a turbine 18 for extracting energy from the combustion gases.

Figure 2:
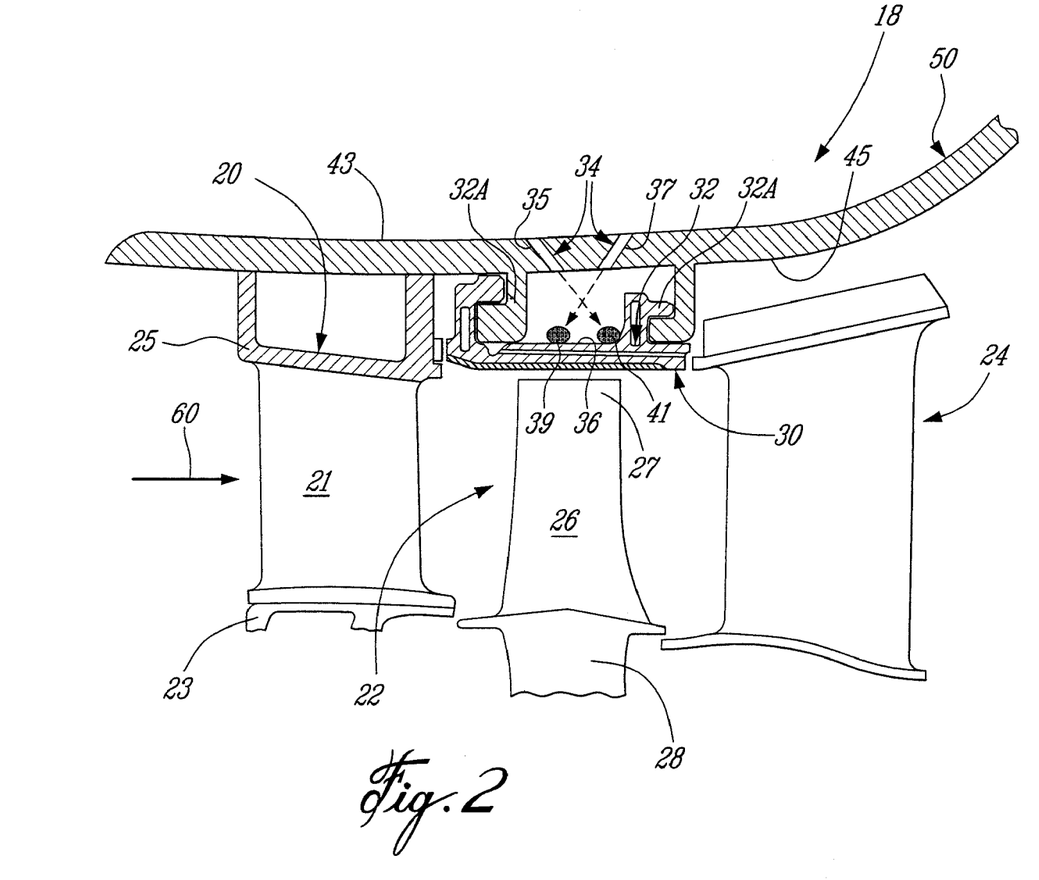
FIG. 2 is cross-sectional view of a portion of the turbine section of the gas turbine engine of FIG. 1, showing a first stage turbine stator vane, a first stage turbine rotor blade which rotates within the surrounding turbine shroud, and a second stage turbine stator vane, and a surrounding turbine support case.

FIG. 2 illustrates a portion of the turbine section 18 of the gas turbine engine 10, which includes a first stage, or high pressure, static turbine stator 20, and a first stage, or high pressure, rotating turbine rotor 22 just downstream from the high pressure turbine stator 20. The high pressure stator 20 includes a plurality of vanes 21 which extend between inner and outer platforms 23, 25. A subsequent stage, such as a low pressure stage for example, turbine stator 24, which is located downstream from the high pressure turbine rotor 22, is also shown. The high pressure turbine (HPT) rotor 22 includes a plurality of radially extending rotor blades 26 mounted to a central rotating hub 28. The HPT rotor spins within a HPT shroud ring 30, which is arranged circumferentially about the periphery of the tips 27 of the rotor blades 26. The shroud ring 30 is composed of a plurality of individual shroud segments 32, disposed end to end, in a sealed manner, about the peripheral circumference of the HPT rotor 22. The shroud ring 30 (including its shroud segments 32) and the stator assembly 20 are both static and fixed to the annular turbine support case (TSC) 50 which surrounds the entire high pressure section of the turbine. The TSC 50 includes a plurality of impingement cooling holes 34 therein, the arrangement and configuration of which controls the cooling air flow (i.e. both mass flow and position) which flows through the TSC 50 to impinge upon the outer surfaces 36 of the shroud segments 32. In the depicted embodiment, the impingement cooling holes 34 include a first row of holes 35 and a second row of holes 37 disposed downstream of the first row. In one embodiment, the holes of each of the rows extend through the TSC 50 at an angle such that the second row of holes 37 directs impinging cooling air onto upstream impingement regions 39 on the surface 36 of the shrouds 32 and the first row of holes 35 directs impinging cooling air onto downstream impingement regions 41 on the surface 36 of the shrouds 32.

As the high pressure stage of the turbine section 18 is disposed immediately downstream from the exit of the combustor 16, all components thereof, including the shrouds segments 32 of the HPT shroud ring 30, are exposed to very high temperatures during operation of the gas turbine engine 10. Specifically, the very high temperature gases which flow through the HPT stage require efficient cooling of the components thereof, including the turbine shrouds 32, such as by using secondary cooling air which is directed therethrough. While it would be desirable to have a substantially uniform circumferential temperature distribution about the full circumference of the exit of the combustor 16, and thus to which the components of the HPT stage are exposed, it is inevitable that hotter and relatively cooler zones occur. These hotter zones, or hot streaks, can be caused by a number of factors, including fluid flow patterns within the combustor and through the HPT airfoils, as well as the location, spacing, and characteristics of the fuel nozzles 17 within the combustor 16. Particularly, because a discrete number of fuel nozzles 17 exist, each producing a separate flame front, it is inevitable that the temperature distribution about the circumference of the exit of the combustor 16, and thus within the HPT stage, varies.

Figure 3:
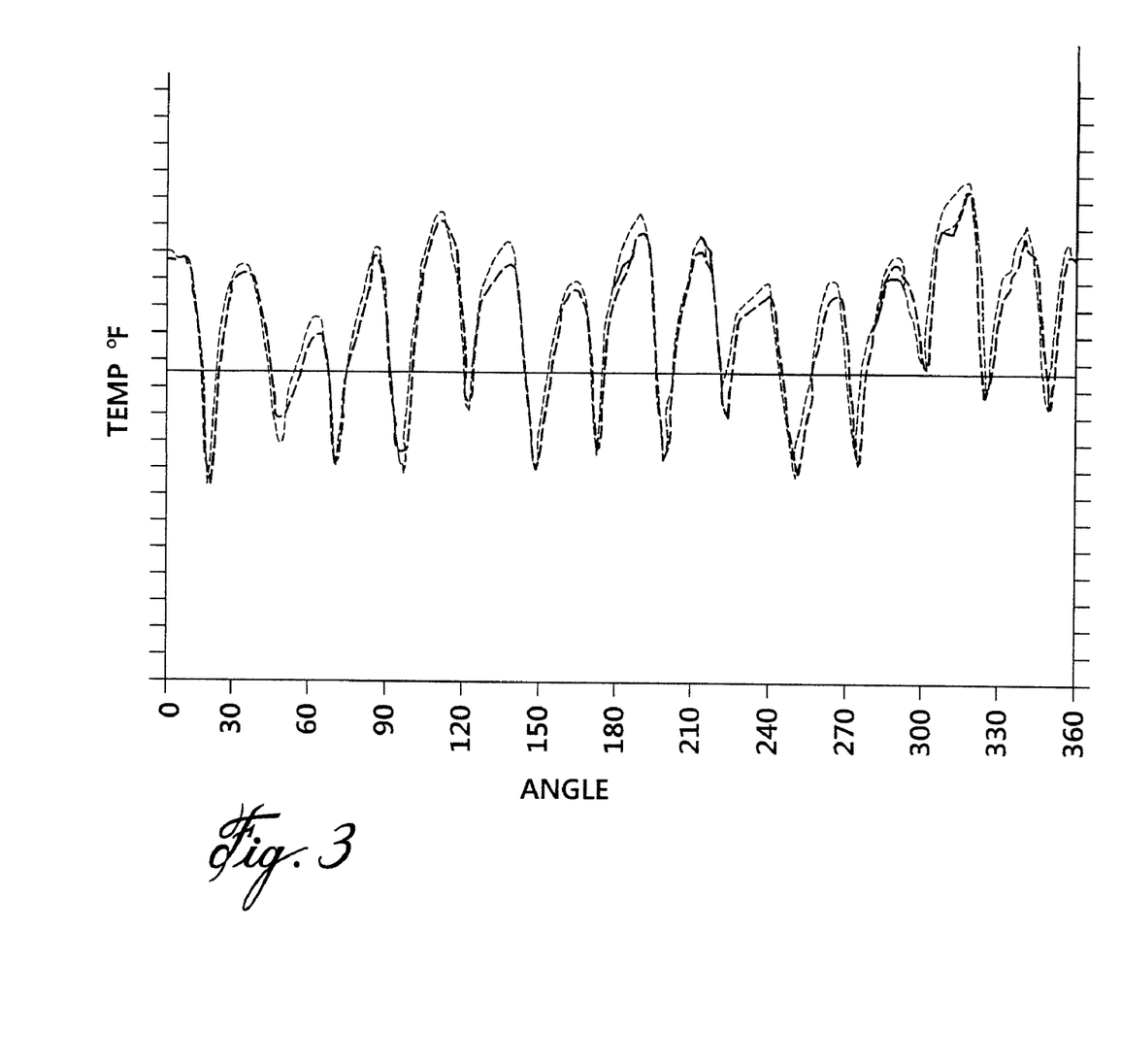
FIG. 3 is a graph of a sample temperature distribution about the circumference of the engine at the turbine shrouds within the turbine section of FIG. 2.

As shown in FIG. 3, the temperature fluctuates about the circumferentially angular position in the gas flow path, to which the HPT components are exposed. Thus hot streaks, or higher temperature gas streams which typically correspond to and are defined by the distribution of the fuel nozzles pass through the HPT stator 20 and rotor 22 before carrying on to the downstream turbine stages. When the airfoils, shrouds and platforms of the HPT stage are exposed to these hot streaks of too high an intensity, the significant local increases in temperature can cause damage and thus a reduction in durability of the parts, caused by accelerated oxidation, cracks, thermo-mechanical fatigue, etc. As such, cooling of these components is desired and in fact in most cases necessary. Cooling of the airfoils and other parts of the HPT components is believed to be the best solution for controlling the temperature, and therefore for maintaining the durability, of these components. The present invention employs cooling air flow, provided through the HPT components and most particularly through the TSC 50, in order to maintain lower and a more equalized temperature distribution about the circumference thereof. However, in order to limit the performance penalties caused by the introduction into the hot gas flow of this cooling air used to cool the surfaces of the shroud segments 32, such cooling must be done efficiently in the manner described below. Impingement cooling will uniformize the thermo-mechanical strain in hot spots area.

The term "clocking" as used herein is understood to mean adjusting the relative circumferential positioning, to align or misalign as desired, of two spaced apart components in a gas flow.

The present approach uses clocking to circumferentially align targeted cooling air flow and identified hotspots. Thus, as described further below, clocking is used in order to determine the circumferential location and amount of additional cooling air required to reduce the temperature in identified hot spots (i.e. locally cool these hot spots) on the shroud segments, thereby preventing excessively high damage to the surfaces in these regions. More specifically, by circumferentially aligning, or "clocking", the cooling air flow provided through the TSC 50 to impingement cool the given hot component (and in at least one embodiment provided particularly onto the shroud segments 32 of the HPT shroud ring 30) is aligned with the circumferential distribution of higher temperature regions (i.e. "hot spots") in the hot gas flow and thus on the component. The skilled reader will appreciate that the local hot spots are affected by the location and arrangement of the upstream fuel nozzles 17. The extra cooling airflow required to cool these hot spots can be minimized by restricting the increased impingement cooling airflow to these hot spot regions, thus limiting the performance penalties caused by the introduction of this cooling air into the hot gas flow. This extra cooling airflow is used to help render uniform the temperature across the surfaces of the shroud segments 32, in both axial and circumferential directions.

Thus, with respect to the present embodiment, cooling air flow which is provided by the impingement cooling holes 34 defined through the TSC 50 is clocked to the circumferential distribution of the high temperature regions (localized hot spots), thereby permitting only the identified hot spot zones on the shrouds to be targeted by this additional cooling air flow. This accordingly helps the axial temperature distribution over the circumference of the shroud segments 32 to be substantially uniform, thereby significantly reducing the likelihood of early onset thermo-mechanical fatigue and/or high oxidation damage to the surfaces of the HPT shroud segments 32. Clocking locally concentrates the cooling air flow in those regions of the shroud segments 32 which correspond to the circumferential peaks in temperature (i.e. the angular locations about the shroud ring 30 corresponding to the high peaks on the graph depicted in FIG. 3), while coolant flow delivered elsewhere is locally reduced to only that required in the relatively cooler spots, which also permits the total cooling air flow consumption to be minimized, as the locations of the shroud ring 30 corresponding to the circumferential locations between fuel nozzles (i.e. corresponding to the low peaks on the graph depicted in FIG. 3) do not need to be cooled or need lesser cooling relative to the identified hot spots.

Although clocking of the cooling of components with local hot spots is described above with particular reference to the cooling of the HPT shroud ring 30 and the shroud segments 32 thereof, it is to be understood that this method is applicable to impingement cooling of any static component located in the turbine section of the gas turbine engine, or any component downstream of the turbine section. Another example is impingement cooling of vane segment platforms. Regardless of what static component requiring cooling is used, the fundamental principle of the present invention remains the same, namely that the cooling air flow be clocked with the hot spots generated by the circumferential distribution of the discrete fuel nozzles in the combustor, which is more efficient that the most commonly applied cooling methods of simply cooling all surfaces equally.

Figure 4:
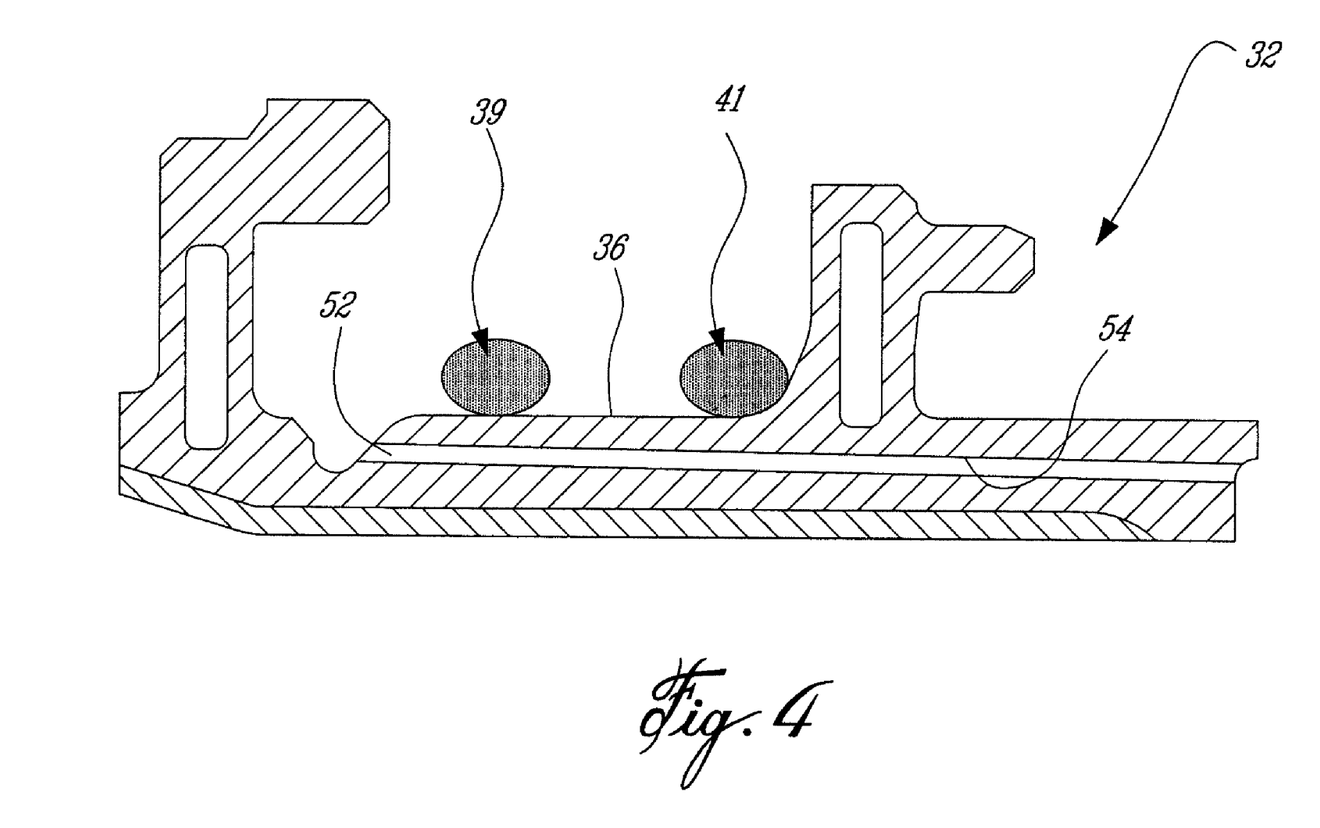
FIG. 4 is a cross-sectional view of a turbine shroud, showing locations of the impingement cooling air flow proximate identified hotspots in an axial direction of the shroud.

Referring back to FIG. 2, the TCS of the present invention includes a plurality of cooling holes 34 which extend through the TCS between circumferential outer and inner surfaces 43, 45 thereof, the cooling holes 34 providing a flow of impinging cooling air onto the surface 36 of the shroud ring 30. As best seen in FIG. 4, once the cooling air has impinged the surface 36, thereby cooling it, it is then directed through opening 52 in the shroud segment 32 and through the internal passage 54 before being ejected out into the main hot gas flow. Thus, the impinging cooling air flow provided by holes 34 in the TSC 50 thereby at least locally cools the areas surrounding the impingement airflow contact regions 39, 41 on the surface 36 of the shroud segment 32 which correspond to identified hot spots as described herein.

As mentioned above, and now referring to FIG. 5, the cooling holes 34 in the TSC 50 (not shown in FIG. 5) include two separate rows of holes, namely a series of upstream holes 35 and a series of downstream holes 37. As described above, the location, size, number and configuration of these cooling holes 34 is determining by clocking the cooling flow generated by the holes 34 with the relative circumferential locations of the local high temperature regions caused by the spaced apart fuel nozzles 17 upstream of the turbine section in the combustor 16. Thus, in practice this process of clocking determines the localization of anticipated hot spot regions 40 on the shroud segments 32, in both an axial and a circumferential direction, such that the cooling holes 34 can be provided in the TSC 50 in such a manner than a majority of the impingement cooling airflow is provided near these expected hot spot zones 40, thereby minimizing the total cooling airflow consumption.

Figure 5:
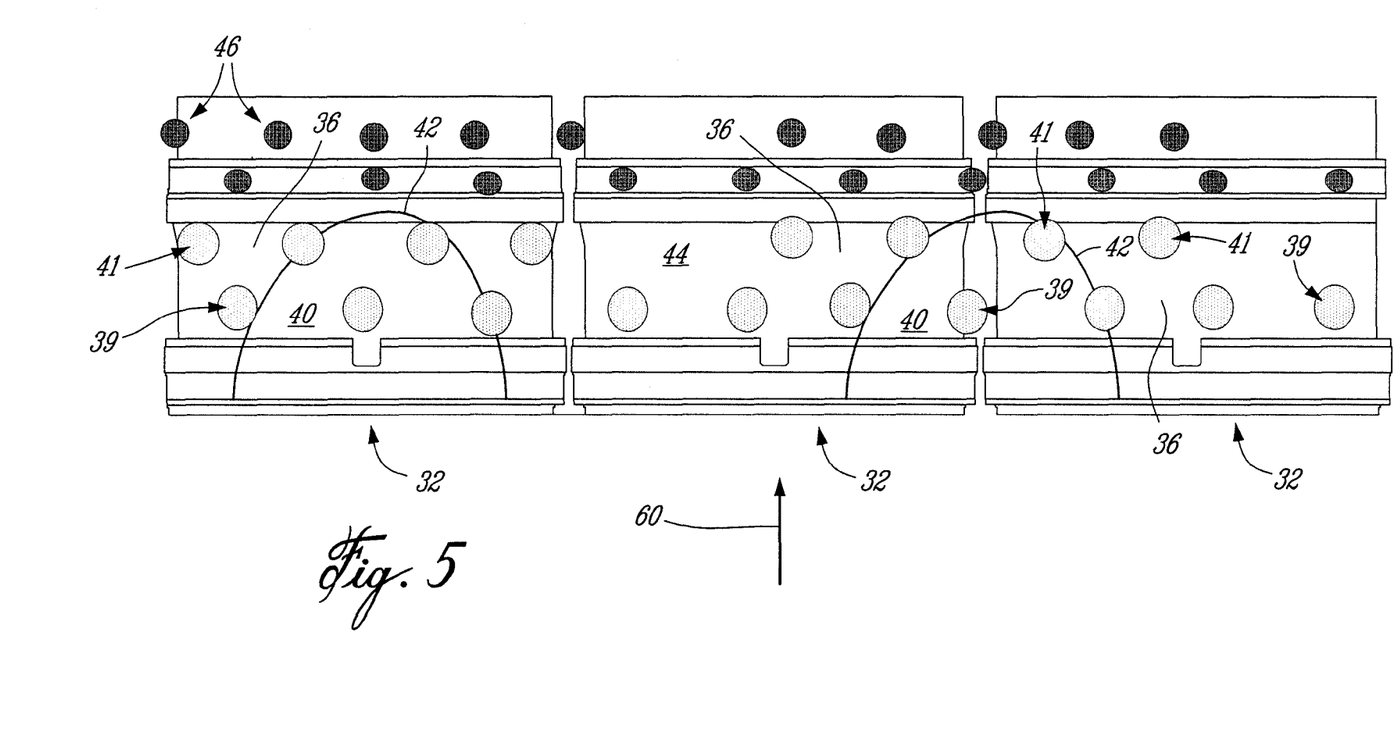
FIG. 5 is a plan view of a series of adjacent turbine shroud segments, having regions thereon cooled by cooling airflow which impinges on the turbine shrouds in a configuration which produces a cooling flow distribution that is clocked to identified hotspots.

A number of the shroud segments 32 which make up a portion of the circumferential shroud ring 30 are shown end to end in FIG. 5, as is one possible schematic representation of the distribution of the cooling holes 34 in the TSC 50 relative to the expected hot spot regions 40, identified using any suitable analytical or experimental technique. As can be seen from FIG. 5, two hot spots 40 span the three shroud segments 32, each having an outer boundary 42 whereby the temperature within this boundary 42 is significantly higher than that outside the boundary. The position and size of these two hot spots 40 will typically be a function of the location of two (typically) fuel nozzles located upstream, and are thus caused by the higher temperature hot streaks generated from these two fuel nozzles. As noted above, in one embodiment the cooling holes 34 defined in the TSC 50 include a first row holes 35 and a second downstream row of holes 37, which respectively generate a first row of impingement contact regions 39 and a second row of impingement contact regions 41 on the surface 36 of the shroud segments 32. Holes 35 and 37 are positioned in this embodiment to direct impingement cooling air onto the shroud between the supporting shroud legs 32a. Preferably, but not necessarily, each of the series of upstream holes 35 and downstream holes 37 in the TSC 50 (shown in FIG. 2) defines a row of holes which are circumferentially aligned with each other (i.e. the upstream holes 35 are circumferentially aligned with each other and the holes 37 are circumferentially aligned with each other). The second row of holes 37 may also be axially offset from the upstream holes 35, which creates a staggered pattern of the impingement contact areas 39 and 41 as seen in FIG. 5. Also, in at least one possible embodiment, the first and second series of holes 35 and 37 in the TSC 50 have approximately the same diameter, but may have slightly different lengths given the difference in the thickness of the shroud segment at the respective upstream and downstream positions. As noted above, the second downstream row of holes 37 are axially offset from the first upstream row of holes 35, and thus the impingement contact spots 39 on the shrouds are axially offset from the rear row of impingement contact spots 41. This helps to maximize the impingement cooling efficient provided by the cooling holes, by eliminating or at least reducing the cross flow effect. Holes 35 and 37 are positioned in this embodiment to direct impingement cooling air onto the shroud between the supporting shroud legs 32a. Regardless, the holes 34 are arranged in a configuration in the TSC 50 such that they produce cooling air flows therefrom that impinge upon the surfaces of the shroud segments 32 at points more predominantly located within and/or near the boundaries 42 of the hot spots 40, such that the cooling air flow provided from these holes will cool these locally higher temperature zones 40 of the shroud segments 32 more than the regions of the shrouds located between and around of these hot spot zones. In FIG. 5, for example, the region 44 located on the middle of the three shroud segments 32 has only a few impingement contact points 39,41 thereon, as the cooling holes 35,37 in the corresponding (i.e. circumferentially aligned) regions of the TSC 50 are less concentrated than they are in the regions thereof which correspond to the areas in and around the hot spot zones 40 on the shroud segments 32. The cooling holes 35,37 in the TSC 50, and therefore their respective impingement points 39,41 on the surfaces of the shroud segments, are thus defined in a band which extends about the circumference of the shroud ring 30, with the cooling holes being arranged in first groups which alternate with second groups of the holes. The first groups provide more cooling air flow to the hotspot regions 40 of the shroud, by being either larger in number or size (diameter), than in correspondingly sized areas defining the second groups. In the depicted embodiment, the holes 35,37 are more densely provided in areas of the TSC 50 which circumferentially align with the identified hotspots 40 than they are in the areas of the band of holes (i.e. the second groups) in between these denser first groups of holes.

As is apparent from FIG. 5, the location of higher concentrations of impingement cooling flow (i.e. location of higher concentrations of holes 35, 37, 46) need not be related to a particular circumferential location on shroud segment, and in some instances may coincide with a centre region of a single shroud segment (e.g. as in the case of the leftmost shroud segment of FIG. 5) or may correspond to a peripheral location of one or more shroud segments (as in the case of the centre and rightmost shroud segments of FIG. 5).

The shroud segments 32 shown in FIG. 5 also show a second set of impingement cooling contact regions 46 thereon, which are created by a corresponding set of cooling holes (not shown in FIG. 2) defined in the TSC 50. These secondary impingement cooling contact regions 46 are located in a circumferential band disposed downstream of the main impingement cooling regions 39,41 near the hotspots 40. The secondary impingement cooling contact regions 46, and therefore the cooling holes in the TSC which produce them, are also more greatly concentrated in the areas just downstream of the hot spots 40 than they are in the areas between two adjacent hot spots (such as near the region 44 for example).

It is of note that the terms upstream and downstream as used herein are with reference to the main flow of hot gas through the turbine section, which is depicted by arrows 60 in FIG. 2 and FIG. 5.

The embodiments of the invention described above are intended to be exemplary. Those skilled in the art will therefore appreciate that the forgoing description is illustrative only, and that various alternatives and modifications can be devised without departing from the spirit of the present invention. For example, alternate cooling hole patterns and configurations than of course possible in addition to the ones described. Modifications are possible without departing of the scope of the invention disclosed. Accordingly, the present is intended to embrace all such alternatives, modifications and variances which fall within the scope of the appended claims.

What is claimed is:

1. A method of cooling a turbine shroud ring within a surrounding turbine support case in a turbine section of a gas turbine engine, the turbine shroud ring including a plurality of individual turbine shroud segments circumferentially arranged to form the turbine shroud ring, at least an inner surface of the shroud ring being exposed to an annular hot gas flow produced from a combustor of the gas turbine engine having a plurality of circumferentially spaced apart fuel nozzles, the method comprising:
identifying a series of alternating high temperature regions and lower temperature regions of a circumferential temperature distribution about the inner surface of the shroud ring, the high temperature regions of the circumferential temperature distribution corresponding to circumferential locations of the fuel nozzles in the combustor; and
impinging cooling air on to an outer surface of the turbine shroud ring using impingement cooling holes in the turbine support case, including the step of impinging more cooling air to regions corresponding to said high temperature regions on the shroud ring than to regions corresponding to said lower temperature regions of the shroud ring, and wherein impingement cooling of the turbine shroud segments forming the turbine shroud ring is non-uniform for all segments.

2. The method as defined in claim 1, further comprising determining an amount of cooling air flow required to reduce the temperature in said high temperature regions such that an axial temperature distribution across the shroud ring is substantially uniform.

3. The method as defined in claim 1, further comprising determining a desired distribution of the cooling air flow on the turbine shroud ring by clocking the targeted locations for cooling to the circumferential positions of the identified local high temperature regions.

4. The method as defined in claim 1, wherein the step of providing more impingement cooling air to the targeted locations further comprising providing a plurality of said impingement cooling holes in the turbine support case surrounding said shroud ring, and grouping said impingement cooing holes in greater concentrations in areas of the turbine support case which circumferentially align with the targeted locations on the shroud ring.

5. The method as defined in claim 1, further comprising selecting an engine running condition during which the circumferential temperature distribution is determined.

6. The method as defined in claim 1, further comprising determining a desired distribution of the cooling air flow which permits impinging more cooling air onto the regions corresponding to said high temperature regions on the shroud ring.

7. The method as defined in claim 6, further comprising targeting said regions corresponding to said high temperature regions by circumferentially aligning said cooling air flow to the high temperature regions on the shroud ring.

8. The method as defined in claim 1, wherein identifying the high temperature regions includes locating an axial coordinate of a center of each of the identified local high temperature regions at identified circumferential positions of the high temperature regions.

9. The method as defined in claim 1, further comprising selecting an amount of cooling air flow such that an axial temperature distribution across the shroud ring is substantially uniform.

10. An impingement cooling system for cooling a static annular turbine shroud ring located downstream of a combustor in a gas turbine engine and surrounding a turbine rotor, the turbine shroud ring including a plurality of individual turbine shroud segments circumferentially arranged to form the annular turbine shroud ring, the combustor including a plurality of circumferentially spaced apart fuel nozzles, the turbine shroud ring being exposed to an annular hot gas flow produced from said combustor, the system comprising a turbine support casing which surrounds the turbine shroud ring, the turbine support casing having a plurality of impingement cooling holes defined therethrough which direct cooling air from a pressurized air source onto a radially outer surface of the turbine shroud ring for impingement cooling of the turbine shroud ring, said impingement cooling holes in the turbine support casing being arranged in an annular band about a circumference of the turbine support casing assembly and including alternating first and second groups of holes, the first groups of holes in use providing more impingement cooling air onto the turbine shroud ring than the second groups of holes, the first groups of holes being provided in varying density, with regions of higher density circumferentially aligned with discrete high temperature regions distributed in use circumferentially around the component, the high temperature regions of the component correspond to periodic high temperature regions in the hot gas flow resulting from the circumferentially spaced apart locations of the fuel nozzles in the combustor, and wherein said impingement cooling holes in the turbine support casing are arranged such that the impingement cooling of the turbine shroud segments forming the turbine shroud ring is non-uniform for all segments and at least one of said discrete high temperature regions extends across one or more of said turbine shroud segments.

11. The system as defined in claim 10, wherein a greater concentration of the first groups of holes are disposed in the casing at a greater concentration than the second groups of holes.

12. The system as defined in claim 10, wherein the annular band of the impingement cooling holes includes a first row of holes and a second row of holes downstream from the first row of holes.

13. The system as defined in claim 12, wherein holes of the first row of holes are circumferentially aligned with each other and holes of the second row of holes are circumferentially aligned with each other.

14. The system as defined in claim 13, wherein the holes of the second row of holes are axially offset from those of the first row of holes.

15. A gas turbine engine comprising: a compressor, a combustor and a turbine serially connected to one another in flow communication, the turbine section including an annular turbine shroud ring for surrounding a stage of turbine blades, the turbine shroud ring including a plurality of individual turbine shroud segments circumferentially arranged to form the annular turbine shroud ring, the turbine shroud ring being concentrically mounted within a supporting turbine support case, the turbine support case having a plurality of impingement cooling holes extending between an inner and an outer surface of the turbine support case and being arranged in a circumferentially extending band, the impingement cooling holes being fed with cooling air from a source disposed outside the turbine support case and directing said cooling air through the turbine support case and onto targeted locations on an outer surface of the turbine shroud ring for impingement cooling of said targeted locations, said impingement cooling holes being arranged in a configuration having first zones of holes which provide more cooling air through the turbine support case and second zones of holes which provide less cooling air through the turbine support case than the first zones, the first and second zones alternating about the circumference of the band, the first zones being circumferentially aligned in the turbine support case to correspond to identified circumferentially spaced high temperature regions of the turbine shroud ring which correspond to circumferentially spaced apart locations of the fuel nozzles in the combustor, and wherein said impingement cooling holes in the turbine support case are arranged such that the impingement cooling of the individual turbine shroud segments forming the turbine shroud ring is non-uniform for all segments and at least one of said high temperature regions cooled by the first zone of holes extends across one or more of said individual turbine shroud segments.

\* \* \* \* \*